Figure 1:
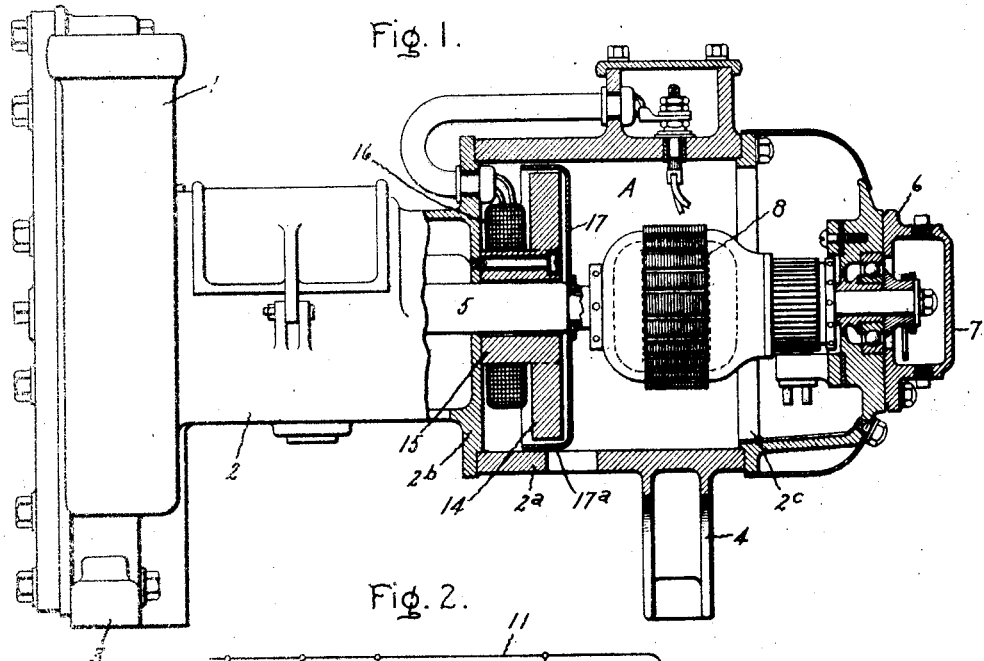

Dec. 18, 1923.

R. G. STANDERWICK

REGULATOR FOR ELECTRIC GENERATORS

Filed July 29, 1915

1,477,781

Inventor:
Reginald G. Standerwick,
by Alfred H. Davis
His Attorney

Patented Dec. 18, 1923.

1,477,781

UNITED STATES PATENT OFFICE.

REGINALD G. STANDERWICK, OF LYNN, MASSACHUSETTS, ASSIGNOR TO GENERAL ELECTRIC COMPANY, A CORPORATION OF NEW YORK.

REGULATOR FOR ELECTRIC GENERATORS.

Application filed July 29, 1915. Serial No. 42,547.

*To all whom it may concern:*

Be it known that I, REGINALD G. STANDERWICK, a subject of the King of Great Britain, residing at Lynn, in the county of Essex, State of Massachusetts, have invented certain new and useful Improvements in Regulators for Electric Generators, of which the following is a specification.

My invention has reference to a system of control for an electric generator, and is particularly applicable to small turbo-generator sets such as are used for train lighting, although it will, of course, be understood that my invention is not limited in its applications to situations of this character, but is capable of general application.

Turbo-generators have heretofore been employed on locomotives for supplying the electrical energy necessary for operating electrical translating devices such as, for example, a headlight and cab-lights, the tubine which operates the generator receiving steam from the locomotive boiler. In installations of this character the load is subject to considerable variation, as happens when either the cab lights or the headlight is disconnected from the circuit, and when the generator and turbine are designed to supply the translating devices with current at their rated voltage at full load, then when the load is decreased the speed of the turbine and of the generator connected thereto is increased, with the result that the voltage on the lamps is increased, and this, of course, results in a short life for the lamps, and, aside from the additional expense occasioned thereby, their premature burning out is likely to occur at times when it is difficult or impossible to renew them or give them attention, and their failure is exceedingly inconvenient, and may lead to serious consequences.

It has heretofore been proposed to control the speed of the prime mover by a centrifugally operated device that regulates the amount of steam admitted to the turbine, but such devices are open to the objection that they are likely to get out of order, and are particularly objectionable for use in connection with turbo-generator sets for locomotive lighting, which are customarily mounted on the locomotive outside of the cab, where it is difficult to give them careful attention.

In accordance with my invention, provision is made for applying to the generator an artificial load which varies inversely as the working load, and in such a manner as to maintain the speed of the generator and the voltage on the system within the limits necessary for satisfactory operation. The load thus applied comprises a magnetic drag having a shunt magnetizing winding and a rotating armature of magnetic material connected to the shaft of the generator and located within the magnetic influence of said winding. Now, a decrease in the working load produces an increase in the speed of the generator and a corresponding increase in the voltage across the brushes of the generator, and this in turn more strongly magnetizes the shunt winding and increases the artificial load. On the other hand, an increase in the working load in the same manner causes a decrease in the artificial load, so that the artificial load varies inversely as the working load. It is to be observed that in my invention the artificial load is continuously applied, and any variation in the working load is promptly manifested in a corresponding inverse variation in the artificial load.

Figure 2:
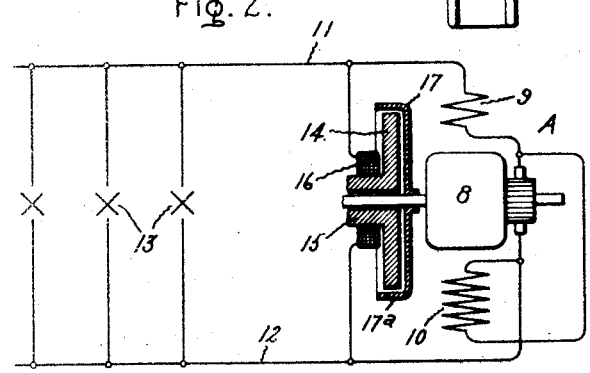
Figure 3:
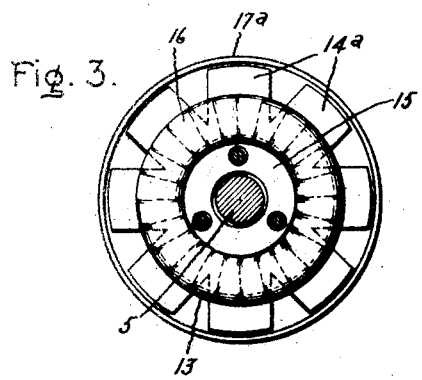

For a fuller understanding of my invention, reference may be had to the accompanying drawing, in which Figure 1 is a side view of a turbo-generator set embodying my invention and showing the generator and the magnetic drag therefor in vertical section; Fig. 2 is a diagrammatic view showing the circuit connections; and Fig. 3 is an end view of the electromagnetic drag shown in Fig. 1.

Referring, now, to the drawings, 1 is a turbine which may receive steam from the locomotive at constant pressure through a reducing valve, in a well-known manner. The frame 2 of the turbo-generator set is supported by legs 3 and 4. One end of the frame comprises a cylindrical portion 2ª, which with a transverse member 2ᵇ and an end piece 2ᶜ constitute a housing for the generator A. The shaft 5 of the turbine is suitably journaled, as at 6, in the frame of the machine, the generator end of the shaft being enclosed by a hood 7. The armature 8 of the generator is mounted directly on the shaft 5. The generator is compounded for substantially constant potential under variable load, and for this purpose is provided with a series field winding 9 and a shunt field winding 10. The particular machine illustrated is bipolar, and one of the pole-pieces is shown in dotted lines in Fig. 1. The generator is connected by supply conductors 11 and 12 to the working load 13, which usually comprises a headlight and cab-lights, and may comprise other translating devices. A field member 14, having pole pieces 14$^a$ (see Fig. 3) extending outwardly nearly to the cylindrical member 2$^a$, is secured by means of a hub 15 to the frame 2 of the generator. The member 14 forms, with the portion 2$^b$ of the frame, a space within which a magnetizing winding 16 connected in shunt to the generator is located. An armature 17 of conducting material, which is preferably composed of copper, and is preferably in the form of a cup-shaped disc, has its flange 17$^a$ extending between the part 2$^a$ of the frame and the poles of the magnetic member 14, and is secured to the shaft 5.

In operation, the shunt coil 16 sets up a magnetic flux, for which the magnetic member 14 and the parts 2$^a$ and 2$^b$ of the frame form a path. The flux in passing between the frame 2$^a$ and the magnetic member 14 threads the flange 17$^a$ of the armature 17. Now, if a part or all of the load is removed from the generator, the speed of the generator and of the rotating copper disc connected thereto tends to increase. Now, it is well known that the eddy currents in such a disc will vary as the square of the speed with constant excitation. But the excitation is not constant for the magnetizing coil is excited from the brushes of the generator, and the exciting current, which is proportional to the generator voltage, will also vary as the square of the speed. It will be seen, therefore, that the eddy current loss in the disc increases very much more rapidly than does the speed of the generator, and as a result of such relatively rapid variation on the part of the eddy current loss it is possible to maintain the speed of the generator within limits which are commercially practicable. It is apparent, therefore, that the magnetic drag which is comprised within my invention, and which is provided with a shunt coil, is particularly well adapted for controlling the speed of the generator, and keeping the same within satisfactory limits, and my invention is to be distinguished from previous devices utilizing a friction type of magnetic brake for controlling the speed of a shaft, which would be unsuited for the purposes of my invention, since the rate of increase of the artificial load would not be sufficiently rapid in proportion to the increase in speed of the generator.

In accordance with the provisions of the patent statutes, I have described the principle of operation of my invention, together with the apparatus which I now consider to represent the best embodiment thereof; it is to be understood, however, that such changes as come within the spirit and scope of the appended claims may be made.

What I claim as new and desire to secure by Letters Patent of the United States, is:—

1. In combination, a generator, the speed of which varies in accordance with load variation, a variable load connected to said generator, and a magnetic drag for the generator comprising a stationary field member provided with a shunt magnetizing winding, the field member being mounted on the frame of the machine and completing its magnetic circuit therethrough, and an armature mounted on the shaft of the generator and having a portion located between the frame of the machine and said field member.

2. In combination, an electric generator, a supply circuit connected thereto, a variable load connected to said supply circuit, and a magnetic drag for the generator comprising a winding connected across the supply circuit and in shunt to the generator for maintaining substantially constant voltage on said supply circuit.

3. In combination, an electric generator, a supply circuit connected thereto, a variable working load connected to said supply circuit, and a magnetic drag comprising a winding connected across the supply circuit and in shunt to the generator for applying to the shaft of the generator an artificial load which varies inversely as the working load.

4. In combination, a turbo-generator set comprising a steam turbine to which steam under constant pressure is supplied, a generator directly connected to the shaft of said turbine, a supply circuit connected to said generator, a variable working load connected to said supply circuit, and a magnetic drag having a winding connected across said supply circuit and in shunt to the generator for applying to the shaft of the generator an artificial load which varies inversely as the working load.

5. In combination, a turbo-generator set comprising a steam turbine, a generator directly connected to the shaft of said turbine, a supply circuit connected to said generator, a variable working load connected to said supply circuit, and a magnetic drag having a winding connected across said supply circuit and in shunt to the generator for applying to the shaft of the generator an artificial load which varies inversely as the working load.

6. A generator connected to supply energy to a variable load, means for driving said generator, the speed of said driving means tending to vary with variations of load on said generator and means for controlling the speed of said driving means, said controlling means comprising a disk of conductive material mechanically connected to the shaft of said generator, means for producing a magnetic field through said disk and means responsive to variations in a characteristic of the load for varying the intensity of said field.

In witness whereof, I have hereunto set my hand this 27th day of July, 1918.

REGINALD G. STANDERWICK.